United States Patent [19]

Dumesnil et al.

[11] 4,186,023

[45] Jan. 29, 1980

[54] SEALING GLASS COMPOSITION

[75] Inventors: Maurice E. Dumesnil, Palo Alto; Ulrich Schreier, San Francisco, both of Calif.

[73] Assignee: Technology Glass Corporation, Sunnyvale, Calif.

[21] Appl. No.: 901,467

[22] Filed: May 1, 1978

[51] Int. Cl.² .................... C03C 3/12; C03C 3/14; C03C 3/30; C03C 12/00

[52] U.S. Cl. .................... 106/53; 106/19; 106/47 R; 106/54

[58] Field of Search .................... 106/47 R, 53, 54, 19

[56] References Cited

U.S. PATENT DOCUMENTS

| | | | |
|---|---|---|---|
| 3,115,415 | 12/1963 | Hoffman | 106/49 |
| 3,250,631 | 5/1966 | Lusher | 106/47 |
| 3,485,648 | 12/1969 | Bishop | 106/53 |
| 4,004,936 | 1/1977 | Powell | 106/53 |

OTHER PUBLICATIONS

Takamori, et al., "Role of Copper Ions in Low-Melting Solder Glasses", 1976, pp. 312-316, Journal of the American Ceramic Society, vol. 59, No. 7-8.

*Primary Examiner*—Carman J. Seccuro
*Attorney, Agent, or Firm*—Limbach, Limbach & Sutton

[57] ABSTRACT

Lead borate and lead zinc borate glasses containing from 0.1 to 10% by weight cuprous oxide ($Cu_2O$) and fluoride, the molar ratio of cuprous oxide to fluoride being in the range 1:0.25 to 1:10, preferably in the range 1:1 to 1:5, and up to 5% by weight bismuth oxide. These glasses may be mixed with particulate refractory fillers in amounts up to about 56% by volume. The sealing glasses are useful for bonding ceramic, glass and metal parts together at low temperatures. They are especially useful as semiconductor package sealants.

9 Claims, No Drawings

SEALING GLASS COMPOSITION

BACKGROUND OF THE INVENTION

In the semiconductor industry, semiconductor materials such as silicon are hermetically sealed in ceramic packages. The function of the package is to provide a protective container for the silicon device.

In the past relatively high temperature sealing glasses of the lead zinc borate type have been employed in packaging. The more successful sealing glasses have been based on $PbO:ZnD:B_2O_3$ in which the components are present at 2:1:1 mol ratios. These lead zinc borate glasses have been modified by the addition of minor amounts of other materials such as silicon dioxide, barium oxide and tin oxide. In the course of use glasses of this type have been thermally devitrified to reduce their thermal expansion. During devitrification the glass is converted from a solid solution to a rigid crystalline skeleton associated with a vitreous matrix characterized by reduced thermal expansion. Thermal expansion can be further reduced and the mechanical strength of the glass can be further increased by the addition of a small amount of a low expansion inert ceramic powder.

The devitrification may be carried out by maintaining the glass at a temperature about 430° C. for a period of about an hour or longer. While these sealing conditions are acceptable in some environments, in the production of ceramic packages long exposure to high temperatures must be avoided and in order to obtain the high glass fluidity required for a proper seal without long high temperature exposure the glasses are commonly subjected to temperatures in the range of 480° to 530° C. for 8 to 12 minutes to complete the seal.

The requirement of a devitrification step during the sealing of ceramic packages with the glasses above described makes the employment of times and temperatures during the sealing process of the order of those described above necessary.

It is an object of this invention to provide sealing glasses which do not require devitrification to form a strong and hermetic seal.

It is a further object of this invention to provide sealing glasses which provide effective seals at greatly reduced time-temperature conditions.

BRIEF DESCRIPTION OF THE INVENTION

Pursuant to the present invention a sealing glass is provided which is non-devitrifiable in the sense that essentially no crystallization occurs when the glass is exposed to a temperature of 430° C. for a period of 15 minutes. Under the sealing conditions required to produce a seal with this glass which are commonly about 400° C. temperature and 5 to 8 minutes time, no crystallization is observed and the glass in the completed seal is vitreous.

This invention describes a novel sealing mixture containing glasses capable of being intimately mixed with large amounts of a wide variety of fillers with minimal effect on glass flow at the sealing temperature while effecting a substantial decrease in the coefficient of thermal expansion of the mixture. Thus vitreous glass seals characterized by high mechanical strength, good chemical stability, low coefficients of expansion and capable of withstanding repeated thermal shocks (MIL-STD-883 specifications) are achieved with our novel low temperature sealing glass compositions (360°-430° C.).

The present invention is directed to very fluid, very low melting glasses produced in the lead borate and lead zinc borate glass forming systems by the joint addition of cuprous oxide and fluorine ($Cu_2O+F$) in concentrations of 0.1 to 10 percent by weight, the molar ratio of cuprous oxide to fluorine being in the range of 1:0.25 to 1:10, preferably in the range of 1:1 to 1:5. The resulting glass can be made even more fluid by the addition of up to 5 percent by weight bismuth oxide ($Bi_2O_3$). The preferred glass compositions are characterized by a DTA softening point in the range of 260°-280° C. linear thermal expansion coefficients of the order of $105-110 \times 10^{-7}/°C.$, remarkable water insolubility, resistance to steam, good glass flow even in a nitrogen atmosphere and the ability of being admixed with large quantities of filler(s) in particulate form while retaining high fluidity at low temperatures.

In accordance with this invention a particulate filler is admixed in amounts reaching 56 percent by volume preferably 5 to 50% by volume to tailor the thermal expansion of the resulting sealing glass to a value as low as $50 \times 10^{-7}/°C.$ The particulate fillers employed in this invention are refractory or semirefractory powders which are any such well known materials, synthetic or natural, conventional in the art and also include materials prepared from glass, recrystallized glass, glass-ceramics, coprecipitated or sintered materials.

The glasses of the invention contain lead oxide, optionally zinc oxide, boron oxide, optionally bismuth oxide, silicon dioxide, cuprous oxide and a minor proportion of at least one solid non-volatile fluoride, the proportions being lead oxide 75 to 85% by weight, zinc oxide when present up to 10% by weight and preferably below 8% by weight, boron oxide 8 to 15% by weight, silicon dioxide 0.75 to 2.5% by weight, bismuth oxide when present 1 to 5% by weight, cuprous oxide 0.5 to 5.5% by weight, and non-volatile metal fluoride in amounts such that the mol ratio of cuprous oxide to the fluoride content of the metal fluoride is in the range of 1:0.25 to 1:10.

The completed seal obtained with these mixtures consist of finely divided refractory particles dispersed in a vitreous glass matrix.

DETAILED DESCRIPTION OF THE INVENTION

Specific sealing glasses according to the invention, sealing conditions employed in their use and the nature of the completed seals are shown in the following examples.

EXAMPLE 1

A base glass was prepared by mixing 4150 grams of red lead oxide ($Pb_3O_4$), 150 grams lead fluoride, 350 grams zinc oxide, 800 grams boric acid, 50 grams silica and 120 grams cuprous oxide. After heating the mixture in a platinum crucible at 1000° C. for 20 minutes, the melt was poured through cold steel rollers to facilitate subsequent crushing. The resulting glass flakes had a composition in weight percent as follows:

$P_bO$:80.8
ZnO:6.75
$B_2O_3$:8.68
$SiO_2$:0.96
$Cu_2O$:2.31
F:0.45 and a corresponding molar ratio $Cu_2O:F$ of 1:1.5 a linear thermal expansion (25°-200° C.)=106×10$^{-7}$/°C. and a DTA (Differential Thermal Analysis) softening point=272° C.

EXAMPLE 2

A base glass was prepared by mixing 4150 grams of red lead oxide ($Pb_3O_4$), 300 grams lead fluoride, 300 grams zinc oxide, 800 grams boric acid, 50 grams silica, 120 grams cuprous oxide and 80 grams bismuth trioxide. After heating the mixture in a platinum crucible at 1000° C. for 20 minutes the melt was poured through cold steel rollers to facilitate subsequent crushing. The resulting glass flakes had a composition in weight percent as follows:

PbO:80.5
ZnO:5.58
$B_2O_3$:8.38
$SiO_2$:0.93
$Cu_2O$:2.23
$Bi_2O_3$:1.49
F:0.87 and a corresponding molar ratio $Cu_2O:F$ of 1:3, a linear thermal expansion (25°-200° C.)=110×10$^{-7}$/°C. and a DTA softening point=260° C.

Additional examples of the sealing glasses of the invention were prepared following the procedure described in Example 1. The compositions of these glasses are shown in Table 1 and the makeup of the mixtures which were heated to produce these glasses is shown in Table 2.

TABLE I

| GLASS COMPOSITIONS IN WEIGHT PERCENT | | | | | | | | |
|---|---|---|---|---|---|---|---|---|
| Example # | 3 | 4 | 5 | 6 | 7 | 8 | 9 | 10 |
| PbO | 81.33 | 81.13 | 81.62 | 80.39 | 80.8 | 79.41 | 79.17 | 77.94 |
| ZnO | — | 4.84 | 3.10 | 2.51 | 6.75 | 6.63 | 5.50 | 7.24 |
| $B_2O_3$ | 11.18 | 9.69 | 11.52 | 12.05 | 8.68 | 8.53 | 9.15 | 8.15 |
| $SiO_2$ | 1.01 | 1.94 | 1.03 | 1 | 0.96 | 0.94 | 0.91 | 0.90 |
| $Cu_2O$ | 5.08 | 1.94 | 2.07 | 1.70 | 2.31 | 2.27 | 1.46 | 2.2 |
| F | 2.36 | 0.45 | 0.64 | 2.33 | 0.45 | 0.44 | 0.85 | 0.41 |
| $Bi_2O_3$ | — | — | — | — | — | — | 1.46 | 3.62 |
| CdO | — | — | — | — | — | — | 1.46 | — |
| BaO | — | — | — | — | — | 1.77 | — | — |
| DTA Softening point °C. | 2.56 | 2.85 | 3.00 | 2.80 | 2.72 | 2.80 | 2.56 | 2.56 |
| Linear thermal expansion 10$^7$/°C. | 140 | 105 | 105 | 140 | 106 | 115 | 110 | 112 |
| Spec. gravity | 7.16 | 7.13 | 7.15 | 7.12 | 7.13 | 7.13 | 7.14 | 7.15 |

TABLE II

| Glass Compositions In Weight Percent Batch Ingredients | | | | | | | | |
|---|---|---|---|---|---|---|---|---|
| Example # | 3 | 4 | 5 | 6 | 7 | 8 | 9 | 10 |
| $Pb_3O_4$ | 62.62 | 73.45 | 71.96 | 61.93 | 76.28 | 74.91 | 71.06 | 70.70 |
| $PbF_2$ | 13.81 | 2.65 | 3.73 | 13.66 | — | — | 5.13 | 2.55 |
| ZnO | — | 4.42 | 2.80 | 2.27 | 6.22 | 6.11 | 5.13 | 6.81 |
| Boric Acid | 18.03 | 15.93 | 18.70 | 19.67 | 14.29 | 14.14 | 13.70 | 13.63 |
| $SiO_2$ | 0.92 | 1.77 | 0.93 | 0.91 | 0.88 | 0.87 | 0.85 | 0.85 |
| $Cu_2O$ | 4.60 | 1.77 | 1.87 | 1.55 | — | 2.09 | 1.37 | 2.05 |
| $Bi_2O_3$ | — | — | — | — | — | — | 1.37 | 3.4 |
| CuF | — | — | — | — | 2.51 | — | — | — |
| $BaF_2$ | — | — | — | — | — | 1.87 | — | — |
| CdO | — | — | — | — | — | — | 1.37 | — |

When the glasses described in the foregoing examples are to be employed in the seaing use they are mixed with a filler which is an inert refractory material having a coefficient of thermal expansion lower than that of the glass and preferably below about 40×10 to the minus 7th/°C. The glass refractory mixture will contain from 1 to about 56% by volume of the refractory, preferably 5 to 50% by volume of the refractory. The mixtures are prepared by introducing the glass and refractory components into a ball mill and milling in conventional manner for the period of about 1 to 32 hours to reduce bulk components to finely divided particles which are uniformly mixed.

The resulting glass refractory mixtures may be applied to the work piece as such or they may be mixed with an organic vehicle to form a past which is used to coat the work piece which is thereafter heated to melt the glass and produce the seal. The organic vehicles are organic liquids which are thermally stable in the sense that they do not undergo explosive decomposition and which boil preferably in the range of about 150° to 250° C. Alpha terpineol, carbitol acetate and butyl carbitol are very suitable vehicles for this purpose but other organic vehicles of this type may be employed.

A number of sealing glass-refractory mixtures have been prepared. The composition, properties and applications of these mixtures are set forth in the following Table 3. Descriptions and sources of the refractory components of the mixture shown in Table III are set forth in Table IV.

TABLE III

| SEALING GLASS COMPOSITIONS | | | | | | |
|---|---|---|---|---|---|---|
| Example # | Filler | Ref. Note* | % filler volume | Glass of Example # | Glass-Filler Mixture Expansion × 10$^7$/°C. | Application |
| 11 | Silica | A | 15 | 2 | 90 | glass to glass |
| 12 | 10% silica +10% alumina | A,B | 20 | 2 | 88 | glass to glass |
| 13 | Alumina | B | 5 | 1 | 100 | glass to glass |
| 14 | beta-eucryptite | C | 15 | 2 | 89 | glass to glass |
| 15 | spodumene | D | 15 | 2 | 92 | glass to glass |
| 16 | Cervit ® | E | 25 | 1 | 82 | alumina |
| 17 | Cervit ® | E | 25 | 2 | 84 | alumina |
| 18 | Copper-aluminosilicate | F | 15 | 2 | 92 | steatite, BeO |
| 19 | Lead feldspar | G | 30 | 2 | 78 | alumina |
| 20 | Zinc aluminosilicate | H | 20 | 1 | 86 | steatite, BeO |
| 21 | Zircon | I | 35 | 1 | 72 | alumina |
| 22 | Zircon | I | 42 | 1 | 66 | " |

TABLE III-continued
SEALING GLASS COMPOSITIONS

| Example # | Filler | Ref. Note* | % filler volume | Glass of Example # | Glass-Filler Mixture Expansion × 10⁷/°C. | Application |
|---|---|---|---|---|---|---|
| 23 | Zircon | I | 30 | 2 | 87 | " |
| 24 | Zircon | I | 44 | 2 | 64 | " |
| 25 | Zircon | I | 56 | 2 | 51 | Kovar |
| 26 | Zinc zirconium silicate | J | 30 | 1 | 77 | alumina |
| 27 | Zirconium Spinel | K | 10 | 1 | 94 | glass to glass |
| 28 | " | K | 18 | 1 | 89 | steatite |
| 29 | " | K | 26 | 1 | 80 | alumina |
| 30 | Lead titanium zirconium silicate | L | 30 | 2 | 78 | alumina |

*Refer to Table IV

TABLE IV
FILLER DESCRIPTION AND SOURCE
(325 mesh powders)

| | | | Linear thermal expansion (25°–300° C.) × 10⁷/°C. |
|---|---|---|---|
| A | Fused silica | | 5 |
| B | 97% alumina | | 64 |
| C | Beta eucryptite | $Li_2O.Al_2O_3.2SiO_2$ Foote Mineral Corp. | −60 |
| D | Spodumene | $Li_2O.Al_2O_3.4SiO_2$ Foote Mineral Corp. | 9 |
| E | Cervit ® | a lithium aluminosilicate glass ceramic mfg. by Owens-Illinois under code #C101 and composed essentially of 76.5%$SiO_2$, 21%$Al_2O_3$,4%$Li_2O$,2.7%CaO,2%$ZrO_2$,1.8%$TiO_2$, 1%ZnO | |
| F | Copper aluminosilicate | $Cu_2.Al_2O_3.O.2SiO_2$ prepared by sintering $CuAlO_2$ and $SiO_2$ | 30 |
| G | Lead feldspar | basically $PbO.Al_2O_3.SiO_2$ glass ceramic formed through the crystallization of a glass 40%PbO 16%$Al_2O_3$, 40% $SiO_2$ and 4% $TiO_2$ as a nucleating agent | 35 |
| H | Zinc aluminosilicate | $ZnO.Al_2O_3.2SiO_2$ prepared by sintering ZnO and $Al_2O_3.2SiO_2$ | 35 |
| I | Zircon | $ZrSiO_4$, zirconium silicate, G milled grade National Lead Co. TAM division | 33 |
| J | Zinc zirconium silicate | $ZnO.ZrO_2.SiO_2$ composition: 28.6%ZnO, 24.2% $SiO_2$,46.4%$ZrO_2$ National Lead Co. TAM division | 32 |
| K | Zirconium spinel | $ZnO.Al_2O_3(0.855)SiO_2(1.43)ZrO_2(1.35)$ corresponding in weight percent to 19.5ZnO,19$Al_2O_3$,21.3$SiO_2$,40.2 $ZrO_2$ National Lead Co. TAM division | 32 |
| L | Lead titanium zirconium silicate | $PbTiZrSiO_7$ ceramic powder prepared by sintering equimolar amounts of lead titanate and zirconium silicate. Essentially in weight percent on oxide basis: 46PhO,16$TiO_2$,25$ZrO_2$,12$SiO_2$ | 35 |

EXAMPLE 31

Several sealing glass compositions were prepared by blending particulate glass of Example 2 with 10 and 20% by volume of zirconia, titanium silicate, tin oxide, aluminum titanate, magnesium stannate, cerium aluminate, aluminum niobate and bismuth titanium zirconium silicate. Satisfactory seals were obtained on matching substrates with these compositions.

More generally the particulate fillers may be any ceramic materials of high melting point, low coefficient of thermal expansion and insoluble or only slightly soluble in the glass and also include materials from glass such as glass ceramics. The preferred fillers have linear coefficients of thermal expansion less than 40×10−7/°C. The refractory fillers employed should be capable of decreasing the thermal expansion of the base glass by about 5 to 60×10−7° C. The type and quantity of refractory fillers used for a mixture with the base glass will depend on the particular application intended. For example if a hermetic glass seal must be made between parts characterized by a very low thermal expansion then a large amount of filler will be added to the particular base glass, the required amount being a function of the thermal expansion of the filler. Since filler tends to decrease the fluidity of the base glass the selection of the filler and its particle size can be made with a view to maintenance of high fluidity.

Application of the glass-refractory mixtures in sealing is described in the following Examples.

EXAMPLE 32

The sealing glass powder prepared according to example 29 (26% by volume zirconium spinel and 74% of glass example 1) was formed into a printing paste by admixing it with terpineol, the paste consisting by weight ratio about 89% powder and 11% terpineol (terpineol 318, Hercules Corporation). The resulting paste was screen printed on opaque and ultraviolet radiation transmitting alumina lids (sintered UV transparent or single crystal sapphire), dried and preglazed in a continuous belt furnace with its maximum temperature set at 380° C. for about one minute to melt the sealing glass material. The thickness of the fused glass layer was of the order of 6 to 8 mils. The glazed alumina lids were inverted and held in position by the pressure exerted by a metal clip to a conventional microelectronic alumina base. The structure was heated at a rate of 100° C. per minute to a peak of 390°–400° C. for 1 to 5 minutes then cooled at a rate of 60° C. per minute to room temperature to produce a tight, strong vitreous seal.

The structure was subjected to an initial leak test as specified by Military Standard Test No. 883, method 1014 by using condition A for fine leaks and condition C to test for large cracks. When so tested the structure indicated a hermeticity level of less than $1 \times 10^{-8}$ cc/sec He. The structure was then subjected to a thermal shock test as described in MIL-STD-883, method 1011, condition C by submerging the structure in a liquid held at 150° C. for 5 minutes and then quenching it in a dry ice bath held at $-65°$ C. within 5 seconds, and held at that temperature for 5 minutes. The cycle was repeated 14 additional times. Leak test conditions A and C were then repeated and the structure again passed these tests, thus indicating the unusually strong nature of the sealing glass of this invention.

EXAMPLE 33

A structure similar to the one described in the previous example was prepared by using a gold plated Kovar (a low expansion alloy that can be sealed to glass) lid instead of an alumina ceramic lid. The structure was glass sealed under the same conditions as described in example 32 with identical hermeticity and strength results, thus indicating the unusually strong and adherent qualities of the sealing glass of this invention even to noble metals such as gold.

EXAMPLE 34

A sealing glass paste was prepared as in example 32 by admixing the powders from example 16 (25 percent by volume Cervit and 75 percent by volume glass example 1) with an organic vehicle, the paste consisting by weight ratio of about 89% powder and 11% vehicle. The resulting paste was applied by screen printing on alumina parts with identical results in strength and hermeticity as those described in example 32.

EXAMPLE 35

A sealing paste was prepared as in example 32 by admixing the powder from example 30 (30 percent by volume lead titanium zirconium silicate and 70 percent glass example 2) with terpineol, the paste consisting by weight ratio of about 89% powder and 11% terpineol. The resulting paste was applied by screen printing on alumina parts with identical strength and hermeticity results as those described in example 32.

EXAMPLE 36

A sealing paste was prepared by admixing an organic vehicle to the solder glass powder from example 26 (30 percent by volume zinc zirconium silicate and 70 percent glass example 1). The resulting paste was applied by screen printing on alumina snapstrate sheets and MACOR (machinable glass ceramic manufactured by Corning) parts with identical strength and hermeticity results as those described in example 32.

EXAMPLE 37

The sealing glass powder prepared according to example 24 (44 percent by volume zirconium silicate and 56 percent glass example 2) was formed into a printing paste by admixing it with terpineol, the paste consisting by weight of about 89% powder and 11% terpineol. The resulting paste was screen printed on Cerdip alumina parts and preglazed to a thickness of 10–14 mils. A Kovar metal lead frame was inserted in the glass layer of the Cerdip base and the structure inverted on a Cerdip top nested on a stainless steel jig. The sealing boat and its content was placed on a continuous belt furnace and heated at a rate of 100° C. per minute to a peak of 415° C. for 5–8 minutes then cooled at a rate of 60° C. per minute to room temperature. The structure was tested according to the conditions described in example 32 with identical strength and hermeticity results.

EXAMPLE 38

The sealing glass compositions described in examples 11, 12 and 14 were applied in paste form on the sealing surface of a television glass tube funnel. The sealing glass was dried without fusing the sealing glass particles. The faceplate was placed on the sealing glass layer in proper position in respect to the funnel and the assembly heated at the rate of 10° C. per minute to 400° C., held for 20–30 minutes at this temperature and then cooled to room temperature at the rate of 5° C. per minute. A hermetic seal was formed between the face plate and the funnel.

Inspection of the seals made in examples 32 to 38 above show the finished seals to be a dispersion of the refractory filler in a vitreous glass matrix.

It may be noted that finished seals of the kind prepared in examples 32 to 38 when exposed to high temperature for an extended time period will exhibit devitrification of the vitreous glass matrix. While devitrification of the vitreous matrix in this manner does not appear to have any adverse affect on the seal no advantage attends this unnecessary and practically undesirable time temperature exposure.

What is claimed is:

1. A sealing glass comprising a homogeneous mixture of lead oxide, zinc oxide, boron oxide, bismuth oxide, silicon dioxide, cuprous oxide and a minor proportion of at least one solid non-volatile metal fluoride, the proportions being lead oxide about 75 to 85 wt %, boron oxide about 8 to 15 wt %, zinc oxide up to 10 wt %, silicon dioxide 0.75 to 2.5 wt %, bismuth oxide to 5 wt %, cuprous oxide 0.5 to 5.5 wt % and non-volatile metal fluoride in amount such that the mol ratio of cuprous oxide to the fluoride content of the metal fluoride is in the range 1:0.25 to 1:10, said sealing glass being non-devitrifiable in that essentially no crystallization occurs when the glass is exposed to a temperature of 430° C. for a period of 15 minutes.

2. The composition of claim 1 wherein the zinc oxide content is in the range 3 to 8 wt %.

3. The composition defined in claim 2 wherein the bismuth oxide content is in the range 1 to 5 wt %.

4. The composition defined in claim 1 or claim 2 wherein the metal fluoride is lead fluoride, cuprous fluoride, zinc fluoride or mixtures of at least two of said metal fluorides.

5. The composition of claim 1 having a finely divided refractory material characterized by a linear coefficient of expansion below $100 \times 10-7/°C$. dispersed in it, said refractory material being present in amount sufficient to constitute up to 56 vol% of the dispersion.

6. The composition of claim 2 having a finely divided refractory material characterized by a linear coefficient of expansion below $100 \times 10-7/°C$. dispersed in it, said refractory being present in amount sufficient to constitute up to 56 vol % of the dispersion.

7. The composition of claim 3 having a finely divided refractory material characterized by a linear coefficient of expansion below $100 \times 10-7/°C$. dispersed in it, said refractory being present in amount sufficient to constitute up to 56 vol % of the dispersion.

8. A mixture consisting essentially of particles of the sealing glass defined in claims 1, 2 or 3 and finely divided refractory material having a coefficient of linear expansion below $40 \times 10-7/°C$., the refractory material constituting from 5 to 50% by volume of the mixture.

9. A printing paste consisting of a mixture of the composition of claim 5, 6 or 7, and a thermally stable organic liquid boiling in the range about 150°–250° C.

* * * * *